US012680524B2

(12) United States Patent
Randklev et al.

(10) Patent No.: US 12,680,524 B2
(45) Date of Patent: Jul. 14, 2026

(54) FUEL INJECTOR SLEEVE AND ENGINE SYSTEM REMANUFACTURING METHOD USING SAME

(71) Applicant: Caterpillar Inc., Peoria, IL (US)

(72) Inventors: Nicholas J. Randklev, Peoria, IL (US); Curtis John Graham, Peoria, IL (US); Jonathan Richard Chittenden, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 65 days.

(21) Appl. No.: 18/663,453

(22) Filed: May 14, 2024

(65) Prior Publication Data

US 2025/0354532 A1 Nov. 20, 2025

(51) Int. Cl.
*F02M 61/14* (2006.01)

(52) U.S. Cl.
CPC ....... *F02M 61/14* (2013.01); *F02M 2200/858* (2013.01)

(58) Field of Classification Search
CPC ......................... F02M 61/14; F02M 2200/858
USPC .......................................................... 123/470
See application file for complete search history.

(56) References Cited

U.S. PATENT DOCUMENTS

| | | | | |
|---|---|---|---|---|
| 5,345,913 A * | 9/1994 | Belshaw | F02M 61/14 123/470 |
| 5,954,343 A * | 9/1999 | Sumida | F02M 61/14 277/434 |
| 6,112,722 A * | 9/2000 | Barnhart | F02M 61/14 123/41.31 |
| 6,119,658 A * | 9/2000 | Jehle | F02M 61/14 123/41.31 |
| 6,155,236 A * | 12/2000 | Jehle | F02M 61/14 123/41.31 |
| 6,988,681 B2 * | 1/2006 | Reiter | F02M 61/168 239/584 |
| 8,291,927 B2 | 10/2012 | Johnson et al. | |
| 8,960,156 B2 * | 2/2015 | Martinsson | F02M 61/168 123/470 |
| 9,593,654 B2 * | 3/2017 | Martinsson | F02F 11/002 |
| 10,471,554 B2 * | 11/2019 | Graham | B23P 6/04 |
| 11,421,636 B2 | 8/2022 | Yamamoto et al. | |
| 11,566,580 B1 * | 1/2023 | Rexavier | F01P 3/16 |
| 11,686,269 B2 * | 6/2023 | Rexavier | F02F 1/4214 123/193.5 |
| 11,859,576 B2 * | 1/2024 | Rexavier | F01P 3/16 |
| 12,078,137 B1 * | 9/2024 | Schick | B25B 27/0035 |
| 2003/0102389 A1 * | 6/2003 | Clarke | F02B 23/0669 239/533.3 |

(Continued)

*Primary Examiner* — Logan M Kraft
*Assistant Examiner* — John D Bailey

(57) ABSTRACT

A fuel injector sleeve for use in a remanufactured engine includes an elongate sleeve body including a clamping shoulder facing an axial direction and forming an undercut, and a sealing ridge transitioning between the undercut and an outer sleeve surface. The sealing ridge defines a sealing line radially outward of the undercut and extending circumferentially and uniformly around the longitudinal axis. The sealing line provides line contact between the sleeve and a clamping surface of a cylinder head to form a seal outboard of erosion upon the clamping surface from prior service. Related apparatus and remanufacturing methodology is also disclosed.

20 Claims, 3 Drawing Sheets

(56) References Cited

U.S. PATENT DOCUMENTS

| | | | | |
|---|---|---|---|---|
| 2010/0050991 | A1* | 3/2010 | Cooke | F02M 61/14 239/289 |
| 2012/0217323 | A1* | 8/2012 | Martinsson | F02M 61/166 72/342.2 |
| 2015/0020386 | A1* | 1/2015 | Shaw | F02F 1/242 29/888.011 |
| 2015/0040857 | A1* | 2/2015 | Franks | F02M 61/14 123/294 |
| 2016/0138540 | A1* | 5/2016 | Franks | F02M 61/14 123/470 |
| 2016/0177871 | A1 | 6/2016 | Graham et al. | |
| 2017/0051713 | A1* | 2/2017 | Peters | F02M 61/14 |
| 2017/0363054 | A1* | 12/2017 | Pickard | F02F 1/242 |
| 2019/0061072 | A1* | 2/2019 | Graham | F02F 3/14 |
| 2019/0255664 | A1* | 8/2019 | Lukasik | B25B 23/0078 |
| 2021/0156349 | A1* | 5/2021 | Perr | F02F 1/186 |
| 2023/0374955 | A1* | 11/2023 | Schumacher | F02M 21/0266 |
| 2023/0407829 | A1* | 12/2023 | Phillips | F02M 61/18 |
| 2025/0116242 | A1* | 4/2025 | Klosterberg | F02F 1/242 |

* cited by examiner

FUEL INJECTOR SLEEVE AND ENGINE SYSTEM REMANUFACTURING METHOD USING SAME

TECHNICAL FIELD

The present disclosure relates generally to the field of remanufacturing, and more particularly to a fuel injector sleeve for use in remanufacturing an engine having a sealing ridge configured for line contact with a clamping surface in a cylinder head.

BACKGROUND

Salvage, repair, reuse, and remanufacturing of various types of machinery and machine components are well-known industries throughout the world. In the context of internal combustion engines, engineers are continually seeking new strategies for returning used engines and engine components to service, particularly heavy-duty engines such as diesel engines.

A diesel engine may be in service in the field for many years, with various systems and components periodically inspected, serviced, and sometimes replaced. It nevertheless eventually becomes desirable to attempt to salvage parts that can be reused or repaired during a complete overhaul of the machinery. Due to harsh and variable operating environments, engineers in the remanufacturing field commonly encounter new and complex problems relating to wear and tear, erosion of surfaces, deformation of parts, changes in material properties, and a host of other challenges. One known strategy for remanufacturing in the engine and fuel systems field is known from U.S. Pat. No. 8,291,927B2 to Johnson et al.

SUMMARY

In one aspect, a fuel injector sleeve includes an elongate sleeve body defining a longitudinal axis and including an inner sleeve surface forming an injector bore extending in an axial direction between a first sleeve end, and a second sleeve end having a thread set and forming an injector tip opening. The elongate sleeve body further includes a middle section having an outer sleeve surface extending between the first sleeve end and the second sleeve end, and a clamping shoulder facing the axial direction and extending radially outward from the second sleeve end to the middle section. The clamping shoulder forms an undercut, and a sealing ridge transitioning between the undercut and the outer sleeve surface and defining a sealing line radially outward of the undercut and extending circumferentially and uniformly around the longitudinal axis.

In another aspect, an engine system includes a cylinder head having a top deck surface, a bottom deck surface, a sleeve bore extending between the top deck surface and the bottom deck surface and opening in the bottom deck surface, and a clamping surface exposed to the sleeve bore. The engine system also includes a sleeve within the sleeve bore defining a longitudinal axis and having a thread set threadedly engaged with the cylinder head, and a clamping shoulder clamped in contact with the clamping surface via the threaded engagement. The clamping surface extends from a radially inward origination location to a radially outward location, and the clamping shoulder includes a sealing ridge defining a sealing line spaced radially outward of the radially inward origination location and extending circumferentially and uniformly around the longitudinal axis.

In still another aspect, a method of remanufacturing a cylinder head includes receiving a cylinder head removed from service in an engine and forming a sleeve bore extending between a top deck surface and a bottom deck surface, and a clamping surface exposed to the sleeve bore. The method further includes installing a sleeve in the sleeve bore, and clamping the sleeve to the cylinder head so as to form a fluid seal between a sealing ridge of the sleeve and the clamping surface at a sealing line located radially outward of a radially inward origination location of the clamping surface.

DETAILED DESCRIPTION

Figure 1:
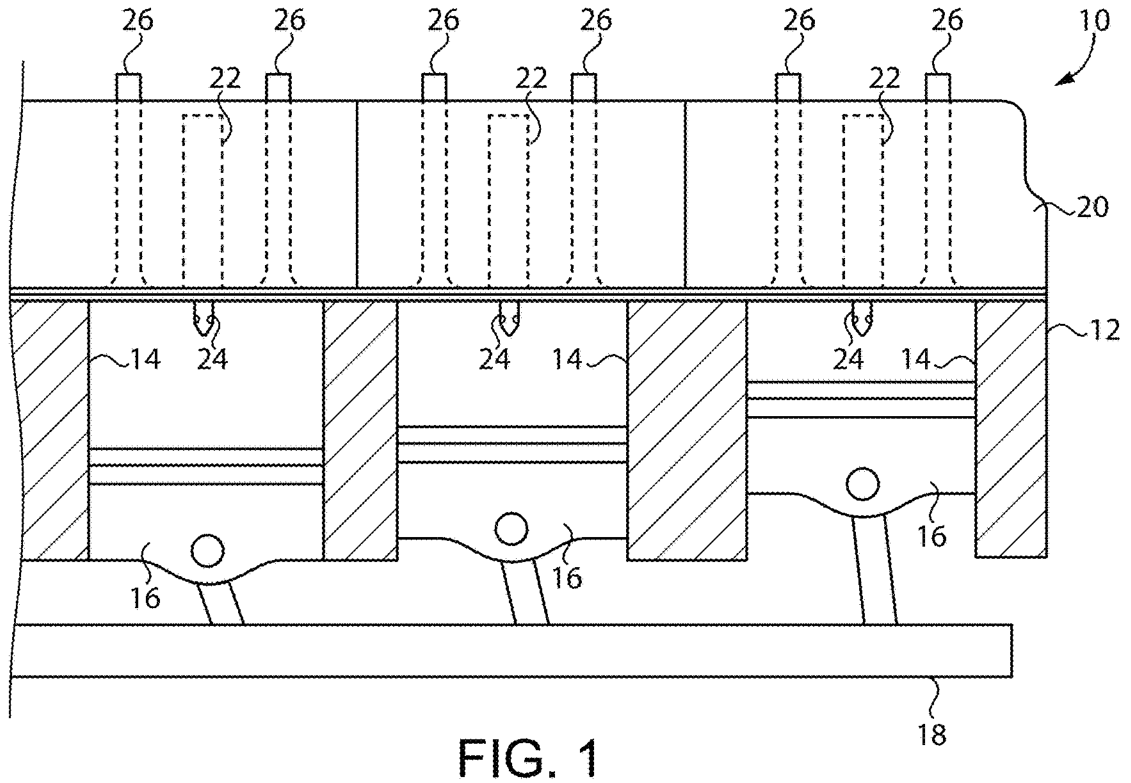
FIG. 1 is a partially sectioned side diagrammatic view of an internal combustion engine, according to one embodiment.

Referring to FIG. 1, there is shown an internal combustion engine 10, according to one embodiment. Engine 10 includes a cylinder block 12 having a plurality of cylinders 14 formed therein. A plurality of pistons 16 are positioned in cylinders 14 and movable in a generally conventional manner between a top-dead-center position and a bottom-dead-center position to rotate a crankshaft 18. Cylinders 14 can include any number in any suitable arrangement such as an inline pattern, a V-pattern, or still another. Engine 10 also includes a cylinder head 20 attached to cylinder block 12. A plurality of engine valves 26 are supported in cylinder head 20 and may include two intake valves and two exhaust valves per each cylinder 14. A plurality of fuel injectors 22 are also supported in cylinder head 20 and each includes an injector tip 24 extending into a respective one of cylinders 14. In one implementation, engine 10 includes a compression-ignition diesel engine, although the present disclosure is not thereby limited. Engine 10 may also include a remanufactured engine, removed from service in a machine system and inspected, repaired, reconditioned and equipped with suitable replacement parts as further discussed herein. Engine 10 can be used in any known application, such as operating a driveline in a land vehicle or a marine vessel or operating an electrical generator, a compressor, or a pump, to name a few examples.

Figure 2:
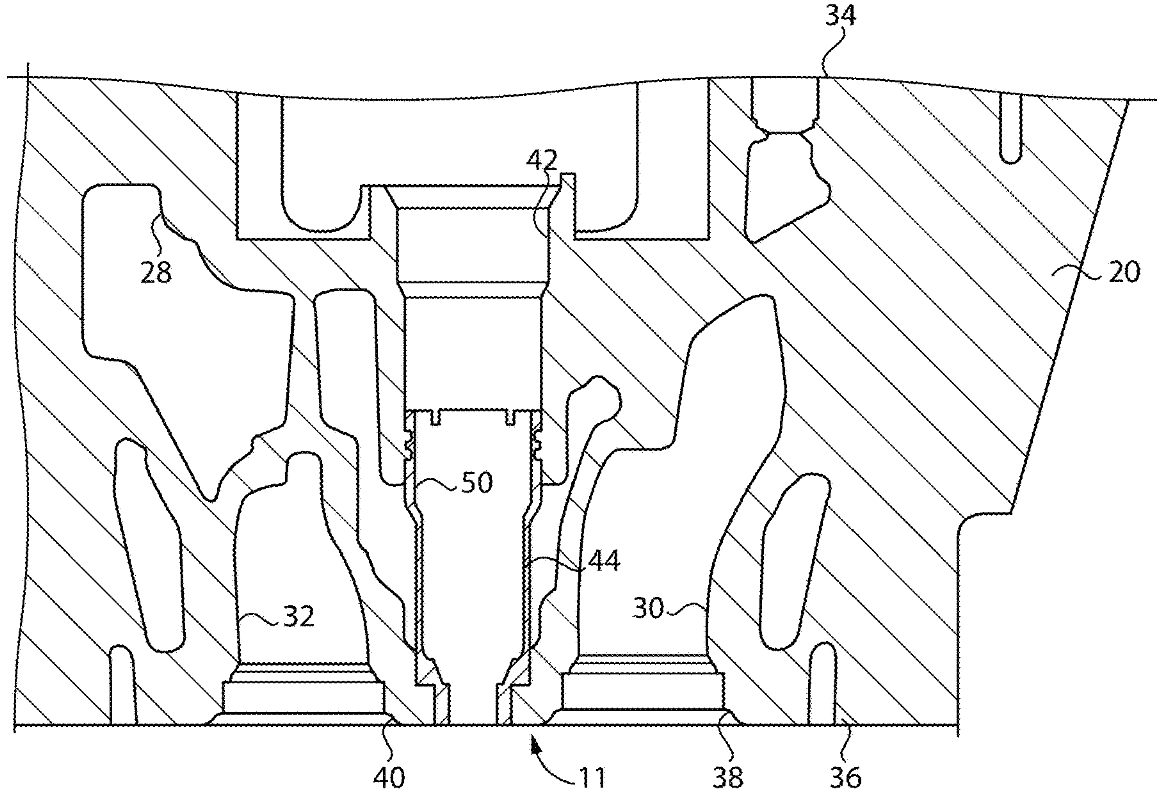
FIG. 2 is a sectioned side diagrammatic view of a portion of the engine of FIG. 1.

Referring also now to FIG. 2, there are shown features of cylinder head 20 in further detail. Cylinder head 20 can be formed of a plurality of separate head sections each associated with a respective one of cylinders 14, or as a so-called slab cylinder head associated with more than one, and potentially all, cylinders in engine 10. Cylinder block 20 includes a top deck surface 34, and a bottom deck surface 36. At least one cooling cavity 28 is defined between top deck surface 34 and bottom deck surface 36. As illustrated, an intake conduit or port 30 extends through cylinder head 20 to an intake opening 38 in bottom deck surface 36. An exhaust conduit or port 32 extends from an exhaust opening 40 also formed in bottom deck surface 36. Cylinder block 20 also includes therein a sleeve bore 42 to receive a fuel injector sleeve and a fuel injector, extending between top deck surface 34 and bottom deck surface 36 and opening in each of top deck surface 34 and bottom deck surface 36. A fuel injector sleeve 44 is positioned within sleeve bore 42 and configured to receive and support a respective one of fuel injectors 22 for service in engine 10.

It has been observed that certain forms of damage or degradation can occur to surfaces of engine 10 during service. In some instances, and as further discussed herein, a seal between a fuel injector sleeve and a cylinder head can be compromised by way of erosion of material of at least one of the cylinder head and the fuel injector sleeve, commonly having the form of surface erosion whereby material is displaced from a clamping and sealing surface of the cylinder head and the fuel injector sleeve. Such erosion potentially causes leakage of coolant between the fuel injector sleeve and the cylinder head into the associated combustion cylinder during service or upon remanufacturing if not rectified. Surfaces inside a cylinder head including within a fuel injector bore can be difficult and potentially impracticable to machine, coat, or otherwise remediate to enable the formation of a reliable seal in a remanufactured engine returned to service. As will be further apparent from the following description, the present disclosure provides unique strategies for enabling establishment of a new coolant seal between a fuel injector sleeve and a cylinder head in a remanufactured engine.

Referring also now to FIGS. 3-6, there are shown features of fuel injector sleeve 44 in further detail. Sleeve 44 includes an elongate sleeve body 46 defining a longitudinal axis 48 and having an inner sleeve surface 50 forming an injector bore 52 extending in an axial direction between a first sleeve end 54 and a second sleeve end 56 having an external thread set 58 and forming an injector tip opening 60. When installed in engine 10 for service injector tip 24 extends through injector tip opening 60.

Elongate sleeve body 46 further includes a middle section 62 having an outer sleeve surface 64 extending between first sleeve end 54 and second sleeve end 56. Middle section 62 also includes a clamping shoulder 66 facing the axial direction and extending radially outward from second sleeve end 56 to middle section 62. When installed for service in cylinder head 20 thread set 58 is threadedly engaged with internal threads (not numbered) of cylinder head 20. Clamping shoulder 66 further forms an undercut 68, and a sealing ridge 70 transitioning between undercut 68 and outer sleeve surface 64. Sealing ridge 70 defines a sealing line 72 radially outward of undercut 68 and extending circumferentially and uniformly around longitudinal axis 48.

Sealing ridge 70 may include a radius 74 transitioning between sealing line 72 and outer sleeve surface 64. Sealing line 72 may be defined by radius 74 at an axially outermost location of clamping shoulder 66. In the present description, the term "axially outward" and like terms is understood to mean a direction generally parallel to longitudinal axis 48 and extending away from a geometric center point of sleeve 44. The term "axially inward" is understood to have a generally opposite meaning. "Radially outward" means a direction generally along a radius of a circle centered on longitudinal axis 48 extending away from longitudinal axis 48. The term "radially inward" has a generally opposite meaning.

Figure 4:
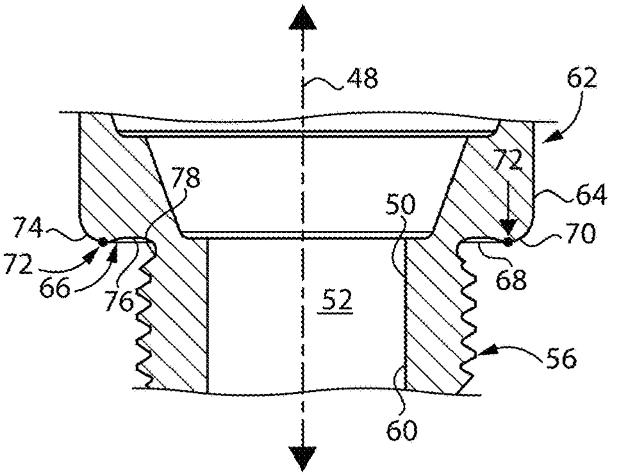
FIG. 4 is a sectioned side diagrammatic view of a portion of the sleeve as in FIG. 3.
Figure 6:
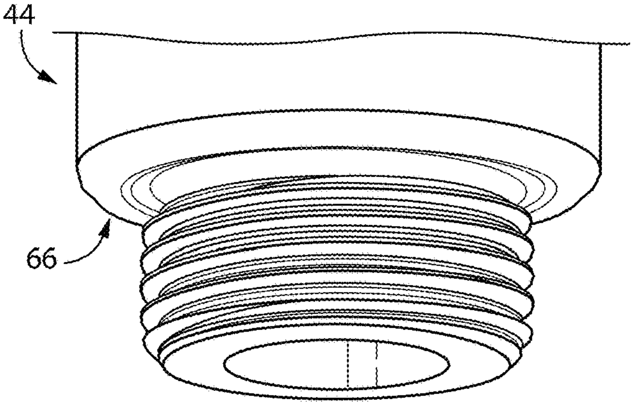
FIG. 6 is another diagrammatic view of a portion of the sleeve as in FIG. 3.
Figure 5:
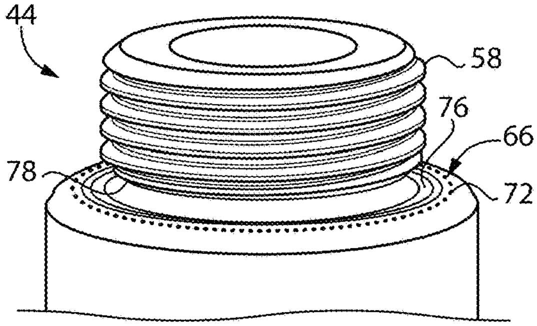
FIG. 5 is a diagrammatic view of a portion of the sleeve as in FIG. 3.

Focusing on FIG. 4, undercut 68 may include an undercut surface 76 that is spaced axially inward from sealing line 72 and extends planarly between sealing ridge 70 and second sleeve end 56. Second sleeve end 56 may further form an inward cutout 78 extending circumferentially and uniformly around longitudinal axis 48 and axially between undercut surface 76 and thread set 58.

It will be recalled that erosion can sometimes be observed in a sealing and clamping surface against which an injector sleeve is clamped when the injector sleeve is removed from a cylinder head having been in service in an engine. As also discussed herein, the erosion can result in difficulty or inability to form a reliable fluid seal between an injector sleeve and said clamping surface. According to the present disclosure, sealing line 72 provides for static line contact, namely, circular line contact, between the curved external surface of sealing ridge 70 and a planar portion of the clamping surface of cylinder head 20 at a sealing location that avoids the existing erosion.

Figure 7:
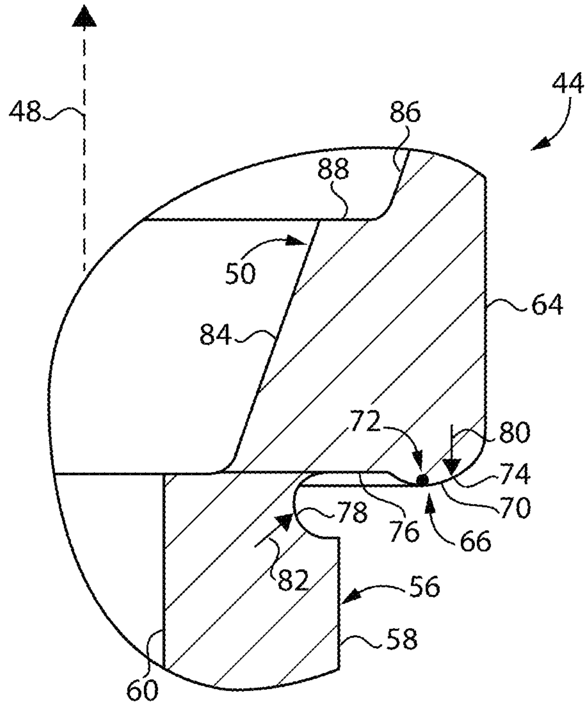
FIG. 7 is a sectioned side diagrammatic view of a portion of the sleeve as in FIG. 3.

Focusing now on FIG. 7, there is shown an enlarged version of a portion of sleeve 44 illustrating some of the surfaces in greater detail. Radius 74 may define a convex radius size 80. Inward cutout 78 may define a concave radius size 82. Convex radius size 80 may be larger than concave radius size 82. In a refinement, convex radius size 80 may be about two times larger than convex radius size 82. As used herein, the term "about" should be understood to mean generally or approximately as would be understood by a person of ordinary skill in the engine remanufacturing arts including, for example, conventional rounding to a consistent number of significant digits or another geometric dimensioning and tolerancing standard applied within routine skill. In a further refinement, convex radius size 80 is 2 millimeters plus or minus a tolerance of 0.2 millimeters.

FIG. 7 also illustrates further features of sleeve 44, including features of inner sleeve surface 50. Inner sleeve surface 50 may include a first conical surface 84 extending from second sleeve end 56 in a second axial direction. The second axial direction is a direction generally along axis 48 and upward in the FIG. 7 illustration toward the top of the page. Inner sleeve surface 50 may also include a second conical surface 86, and a planar transition surface 88 between first conical surface 84 and second conical surface 86. As can be seen from FIG. 7 sealing line 72 may be located radially outward of planar transition surface 88.

Figure 3:
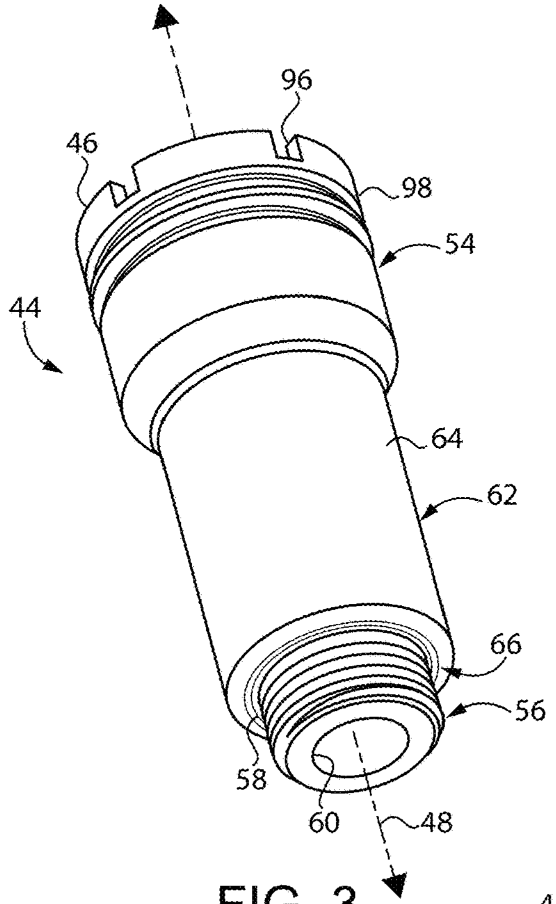
FIG. 3 is an isometric view of a sleeve, according to one embodiment.

Referring briefly back to FIG. 3, there it can be seen that first sleeve end 54 includes a plurality of tool engagement slots 96 for threadedly engaging and disengaging thread set 56 in injector bore 42 in cylinder head 20. Tool engagement slots 96 may include open slots formed in a terminal end of first sleeve end 54. Other embodiments could include different configurations of tool engagement slots or tool engagement surfaces, including internal surfaces formed by inner sleeve surface 50. In an embodiment, a bespoke tool for rotating sleeve 44 that can engage in tool engagement slots 96 may be used. A plurality of O-ring grooves 98 are also formed in first sleeve end 54 and shown in FIG. 3 for fluidly sealing with cylinder head 20.

Figure 8:
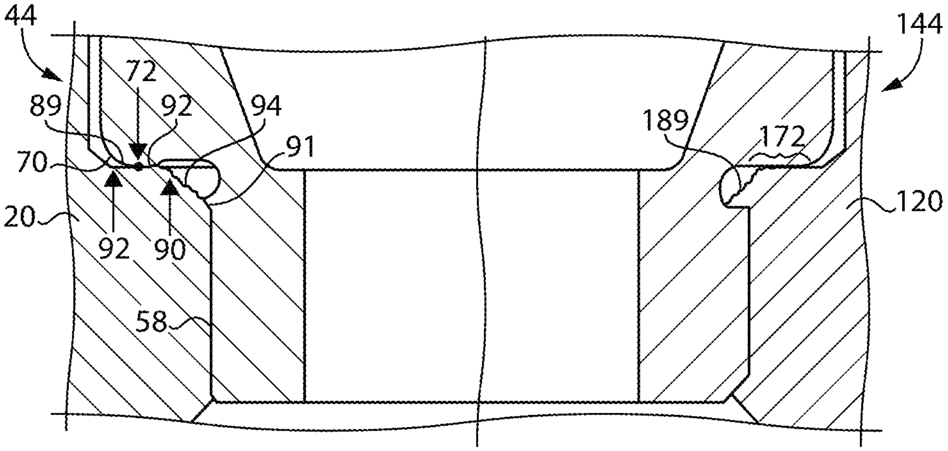
FIG. 8 is a comparative view of a sleeve installed in a remanufactured engine in comparison to an original sleeve installed in an engine yet to be remanufactured.

Referring now also to FIG. 8, there is shown a comparative view of a sleeve 44 according to the present disclosure on the left side of the drawing, and a known sleeve 144 on the right side of the drawing. In FIG. 8 numeral 89 shows a clamping surface of cylinder head 20 against which sleeve 44 is clamped. Numeral 189 shows a surface against which sleeve 144 is clamped to a cylinder head 120. It will be recalled erosion can be observed on cylinder head surfaces in a cylinder head removed from service. In FIG. 8 it can be seen that an angled surface 91 adjoins clamping surface 89. Numeral 94 shows an eroded surface or erosional features upon angled surface 91 and extending up and onto clamping surface 89. Similar erosional features can be seen on cylinder head 120. It can also be seen from FIG. 8 that a smooth surface 92 of clamping surface 89 is located radially outward of eroded surface 94. Sealing line 72 is defined at a location that is upon smooth surface 92. In an embodiment, clamping surface 89 extends from a radially inward origination location 90, at an intersection with angled surface 91, to a radially outward location, and sealing ridge 68 defining sealing line 72 is located and shaped to space sealing line 72 radially outward of radially inward origination location 90. In the manner described, sealing line 72 provides a fluid seal that is not impacted by the presence of erosional features. In the illustration of the known sleeve 144 it can be seen that instead of a sealing line, a more diffuse sealing zone 172 extends across an interfacing contact between sleeve 144 and cylinder head 120 and includes erosional features.

INDUSTRIAL APPLICABILITY

Referring to the drawings generally, but with continued focus on FIG. 8, when an engine is removed from service and prepared for remanufacturing, cylinder head 20 may be processed by removing an existing sleeve to expose clamping surface 89. Cylinder head 20 can also be processed according to any other suitable and desired top-end overhaul practices. When reassembly commences, sleeve 44 as a new sleeve can be installed in sleeve bore 42. Sleeve 44 may be clamped to cylinder head 20 so as to form a fluid seal between sealing ridge 70 of sleeve 44 and clamping surface 89 at sealing line 72 located radially outward of radially inward origination location 90 of clamping surface 89.

It will be recalled sleeve 44 includes undercut 68 and inward cutout 78. During clamping installation of sleeve 44 in bore 42, threaded engagement of thread set 56 with cylinder head 20 can increase a contact pressure of sealing ridge 70 against clamping surface 89, with sleeve 44 stretching somewhat at locations of undercut 68 and/or inward cutout 78. In some instances, stretching sleeve 44 can result in radius 74 rolling against planar clamping surface 89, in particular the planar smooth surface 92. As a result, substantially more concentrated clamping loads and a robust metal-to-metal seal can be formed as compared to conventional strategies.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A fuel injector sleeve comprising:

an elongate sleeve body defining a longitudinal axis and including an inner sleeve surface forming an injector bore extending in an axial direction from a first sleeve end toward a second sleeve end having a thread set and forming an injector tip opening;

the elongate sleeve body further including a middle section having an outer sleeve surface extending between the first sleeve end and the second sleeve end, and a clamping shoulder facing the axial direction and extending radially outward from the second sleeve end to the middle section; and the clamping shoulder forming an undercut, and a sealing ridge transitioning between the undercut and the outer sleeve surface, and the sealing ridge defining a sealing line at an outermost extremity of the clamping shoulder in the axial direction, located radially outward of the undercut and extending circumferentially and uniformly around the longitudinal axis.

2. The fuel injector sleeve of claim 1 wherein the sealing ridge includes a radius transitioning between the sealing line and the outer sleeve surface, and the sealing line is defined by the radius at an axially outermost location of the clamping shoulder.

3. The fuel injector sleeve of claim 2 wherein the undercut includes an undercut surface that is spaced axially inward from the sealing line and extends planarly between the sealing ridge and the second sleeve end.

4. The fuel injector sleeve of claim 3 wherein the second sleeve end forms an inward cutout extending circumferentially and uniformly around the longitudinal axis and axially between the undercut surface and the thread set.

5. The fuel injector sleeve of claim 4 wherein the radius defines a convex radius size, and the inward cutout defines a concave radius size, and the convex radius size is larger than the concave radius size.

6. The fuel injector sleeve of claim 5 wherein the convex radius size is about two times larger than the concave radius size.

7. The fuel injector sleeve of claim 6 wherein the convex radius size is two millimeters, plus or minus a tolerance of 0.2 millimeters.

8. The fuel injector sleeve of claim 1 wherein the inner sleeve surface includes a first conical surface extending from the second sleeve end in a second axial direction, a second conical surface, and a planar transition surface between the first conical surface and the second conical surface, and wherein the sealing line is located radially outward of the planar transition surface.

9. The fuel injector sleeve of claim 1 wherein the first sleeve end includes a plurality of tool engagement slots for threadedly engaging the thread set in a sleeve bore in a cylinder head.

10. An engine system comprising:

a cylinder head including a top deck surface, a bottom deck surface, a sleeve bore extending between the top deck surface and the bottom deck surface and opening in the bottom deck surface, and an upwardly facing clamping surface exposed to the sleeve bore;

a sleeve within the sleeve bore defining a longitudinal axis and including a thread set threadedly engaged with the cylinder head, and a clamping shoulder clamped in contact with the clamping surface via the threaded engagement; and the clamping surface extending from a radially inward origination location to a radially outward location, and the clamping shoulder including a sealing ridge defining a sealing line spaced radially outward of the radially inward origination location and extending circumferentially and uniformly around the longitudinal axis.

11. The engine system of claim 10 wherein the sealing ridge includes a radius defining the sealing line.

12. The engine system of claim 11 wherein the clamping shoulder forms an undercut, and the sealing line is radially outward of the undercut.

13. The engine system of claim 12 wherein the sleeve includes an outer sleeve surface, and the radius transitions between the sealing line and the outer sleeve surface.

14. The engine system of claim 10 wherein the clamping surface includes a smooth surface contacted by the sealing ridge at the sealing line, and an eroded surface extending between the sealing line and the radially inward origination location.

15. The engine system of claim 12 wherein the sleeve forms a cutout, and the undercut extends between the cutout and the sealing ridge.

16. A method of remanufacturing a cylinder head comprising:

receiving a cylinder head removed from service in an engine and forming a sleeve bore extending between a top deck surface and a bottom deck surface, and an upwardly facing clamping surface exposed to the sleeve bore;

installing a sleeve in the sleeve bore; and clamping the sleeve to the cylinder head so as to form a fluid seal between a sealing ridge of the sleeve and the clamping surface at a sealing line located radially outward of a radially inward origination location of the clamping surface.

17. The method of claim 16 wherein the clamping of the sleeve includes clamping the sleeve via threaded engagement of a sleeve end with the cylinder head, and further comprising stretching the sleeve between the sleeve end and the sealing line via the clamping the sleeve.

18. The method of claim 17 wherein the sleeve forms an undercut between the sleeve end and the sealing ridge.

19. The method of claim 18 further comprising rolling a radius defining the sealing line against the clamping surface during the stretching the sleeve.

20. The method of claim 16 wherein the sealing line is located radially outward of an eroded surface of the clamping surface.

* * * * *